July 31, 1962  G. KARGL  3,046,857
APPARATUS FOR USE IN AERIAL PHOTOGRAPHY
Original Filed April 20, 1955  5 Sheets-Sheet 1

INVENTOR
GILARD KARGL
BY Burns, Doane, Benedict & Irons
ATTORNEYS

July 31, 1962 G. KARGL 3,046,857
APPARATUS FOR USE IN AERIAL PHOTOGRAPHY
Original Filed April 20, 1955 5 Sheets-Sheet 2

Fig. 4.

INVENTOR
GILARD KARGL

BY
Burns, Doane, Benedict & Olsons
ATTORNEYS

INVENTOR
GILARD KARGL

July 31, 1962  G. KARGL  3,046,857
APPARATUS FOR USE IN AERIAL PHOTOGRAPHY
Original Filed April 20, 1955  5 Sheets-Sheet 4

INVENTOR
GILARD KARGL
BY
Burns, Doane, Benedict & Irons
ATTORNEYS

July 31, 1962 G. KARGL 3,046,857
APPARATUS FOR USE IN AERIAL PHOTOGRAPHY
Original Filed April 20, 1955 5 Sheets-Sheet 5

Fig. 9.

INVENTOR
GILARD KARGL

BY
Burns, Doane, Benedict & Colons
ATTORNEYS

United States Patent Office 3,046,857
Patented July 31, 1962

3,046,857
APPARATUS FOR USE IN AERIAL
PHOTOGRAPHY
Gilard Kargl, P.O. 6563, San Antonio, Tex.
Original application Apr. 20, 1955, Ser. No. 502,617. Divided and this application May 9, 1958, Ser. No. 734,176
6 Claims. (Cl. 95—1.1)

This invention relates generally to improvements in the art of aerial photography. More particularly, the invention is directed to apparatus for recording and determining the tilt or deviation of the aerial camera from the vertical existent at the time of taking an aerial photograph.

For many years the art of surveying by photographic methods has been recognized as a highly efficient and accurate means for producing maps and other topographical studies. A serious problem encountered in photogrammetry has been the difficulty in insuring that the aerial camera is vertically aligned at the time of making the exposure and in the absence of such vertical alignment to determine accurately the extent and direction to which the axis of the camera was inclined from the vertical at the time of the aerial exposure. In other words, to minimize the distortion in the final aerial photograph and thus achieve maximum accuracy in the aerial survey, the focal plane of the aerial camera should theoretically be normal to a line extending radially outwardly from the center of the earth through the center of the aerial camera film.

Since, in actual practice it is all but impossible to invariably secure alignment of the aerial camera during photographing with the vertical due to variations in flight of the aerial surveying aircraft, attempts have been made in the past to provide means whereby a determination of the tilt or camera inclination can be recorded or indicated at the time of taking the aerial photograph. Such indication of tilt is then employed in correcting or rectifying the aerial photograph to overcome the distortion or inaccuracy in the photograph created by the fact that such photograph was taken with the camera tilted from proper vertical alignment. For example, it has been previously suggested that the degree of tilt or deviation of the camera from vertical be indicated or recorded by employing a gyroscope which presumably sets up a stable reference point for comparison with the attitude of the camera at any particular instant. An example of this approach to the recording of tilt for aerial photography is shown in Fairchild Patent 1,546,372, dated July 21, 1925.

Whereas in theory the gyroscope may seem ideal, in actuality utilization of the information derived from a gyroscope reference in correcting aerial photographs has proved not only complicated and time-consuming but also not sufficiently reliable and accurate for correcting aerial photographs. Recognizing the deficiencies inherent in the use of the gyroscope as a reference point and in other methods previously suggested in the art, the invention of this application is directed to a method and apparatus for accurately determining the tilt of the aerial camera wherein the earth, which is of course the subject of the aerial survey, serves as the reference and more particularly the horizon provides the reference points for indicating tilt. Such method and apparatus achieves utmost simplicity in determining the existence of aerial camera tilt and in permitting accurate computation of such tilt for use in rectifying the aerial photograph.

It is a principal object of this invention to provide an apparatus for determining the tilt of an aerial camera at the time of taking an aerial photograph, which tilt is determined both as to magnitude and azimuth relative to the direction of flight of the survey aircraft and therefore may be used in rectifying the photograph to compensate for the tilt which may have existed at the time of taking such photograph.

It is also an object of this invention to provide an apparatus which will offer an auxiliary record of the tilt of an aerial camera for each aerial photograph taken with such record incorporating photographic views of the horizon taken in predetermined angularly spaced directions with respect to one another.

It is a further object of this invention to provide an aerial surveying camera with an auxiliary camera having a separate film for recording thereon for each photograph taken by the aerial camera views of the attitude of the horizon with respect to the aerial camera taken in predetermined angularly spaced directions at the time of taking each aerial photograph and also including as a part of the record for each aerial photograph a designation of the altitude at which such photograph was taken and, a numerical designation for correlating the appropriate portion of the separate film with the particular similarly numbered aerial photograph.

It is an additional object of this invention to provide a computing apparatus wherein the data recorded on the auxiliary film of a tilt recording camera in the form of horizon views taken in predetermined angularly spaced directions may be correlated with the direction of flight of the surveying aircraft at the time of taking the aerial photograph so as to provide as a resultant the magnitude and azimuth of tilt relative to the vertical at which the aerial camera, which was aligned with the direction of flight, was positioned at the time of taking the particular aerial photograph.

The above and other objects and novel features of the instant invention will be apparent from the following description taken in connection with the accompanying drawings. It is to be expressly understood, however, that the drawings are for the purpose of illustration only and are not intended to define the limits of the invention but rather to merely illustrate one embodiment and structure incorporating the features of the instant invention and for performing the method of this invention.

In the drawings wherein like reference characteristics refer to like parts throughout the several views.

Figure 1:
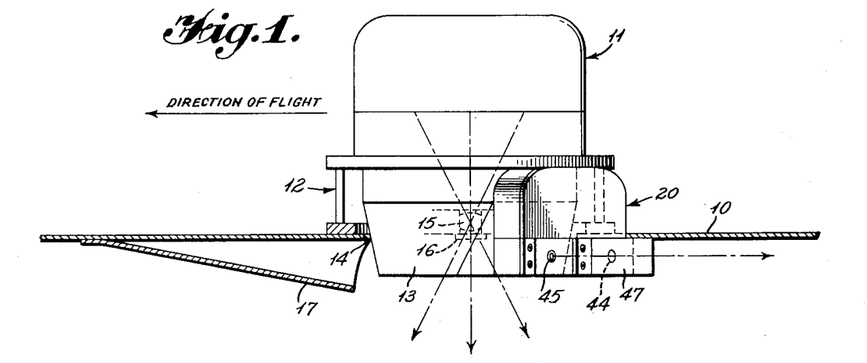
FIGURE 1 illustrates an aerial camera embodying a tilt recording auxiliary camera mounted on the underside of the fuselage of an aerial surveying aircraft.

FIGURE 1 on the drawings illustrates the relation of the aerial camera and auxiliary camera of this invention to the lower underside of a fuselage 10 of an aerial surveying aircraft. The aerial camera 11 is mounted on a support 12 with the cone 13 of the aerial camera projecting downwardly through an opening 14 formed in the fuselage. The support 12 which carries the aerial camera 11 permits the camera to be oriented relative to the aircraft so as to be substantially aligned with the direction of flight with reference to the terrain over which the aircraft is moved. The support 12 also conventionally provides a mounting for the aerial camera such that the camera may be adjusted to be aimed vertically downwardly irrespective of pitch and/or roll deviations of the surveying aircraft from a horizontal level flight.

The cone 13 of the aerial camera projects downwardly for only a relatively small distance below the underside of the fuselage and houses therein the lens 15 and shutter mechanism 16 of the aerial camera. An air deflector 17 is secured to the underside of the aircraft fuselage 10 immediately forward of the downwardly protruding cone 13. Such deflector serves to protect the parts of the aerial camera as well as the auxiliary camera which, as will be described in detail, is mounted on the side of the cone of the aerial camera.

Figure 2:
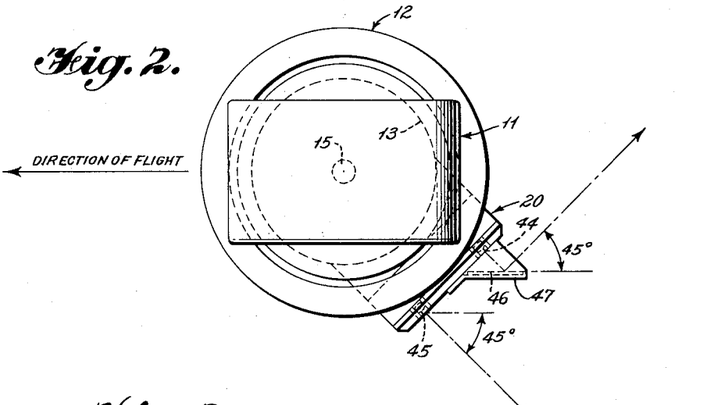
FIGURE 2 is a plan view of the aerial camera and auxiliary tilt recording camera of FIGURE 1 illustrating the normal relation of the direction of flight at the time of taking the aerial photographs to the horizon views recorded by the auxiliary camera and to the position of the aerial camera itself.

The cone 13 of aerial camera 11 has mounted thereon an auxiliary camera 20 which functions to record for each survey photograph taken by aerial camera 11 a pair of horizon views. In the structure as shown on the drawing, these views are taken in mutually perpendicular directions relative to one another. As shown on FIGURE 2, the aerial camera 11 is normally generally aligned with the direction of flight of the surveying aircraft. The auxiliary camera 20 mounted on the cone 13 of the aerial camera records views of the horizon through reflector means described in detail hereinafter with each horizon view taken at a 45° angle relative to the direction of flight. Thus, the auxiliary camera records the attitude of the horizon relative to the surveying aircraft at points angularly spaced through an arc of 45° on opposite sides of the direction of flight and therefore at 90° with respect to each other.

Figure 4:
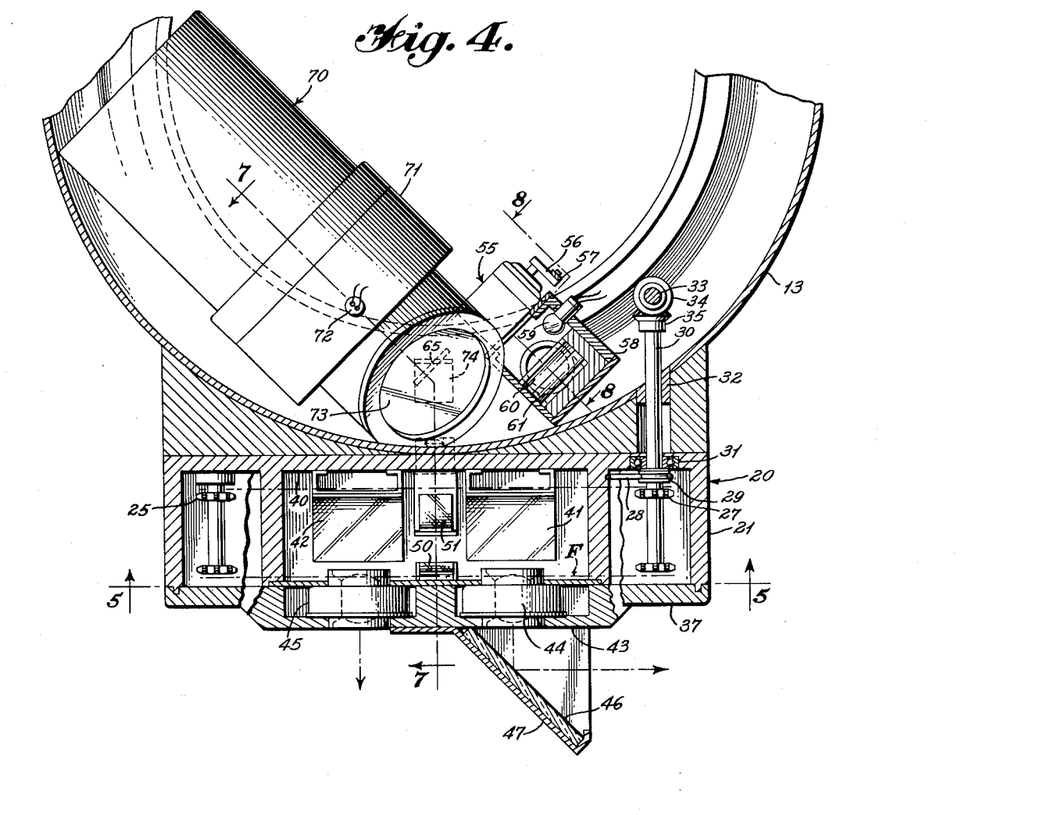
FIGURE 4 is a horizontal sectional view through the cone of the aerial camera showing the relation of the auxiliary tilt recording camera thereto.
Figure 5:
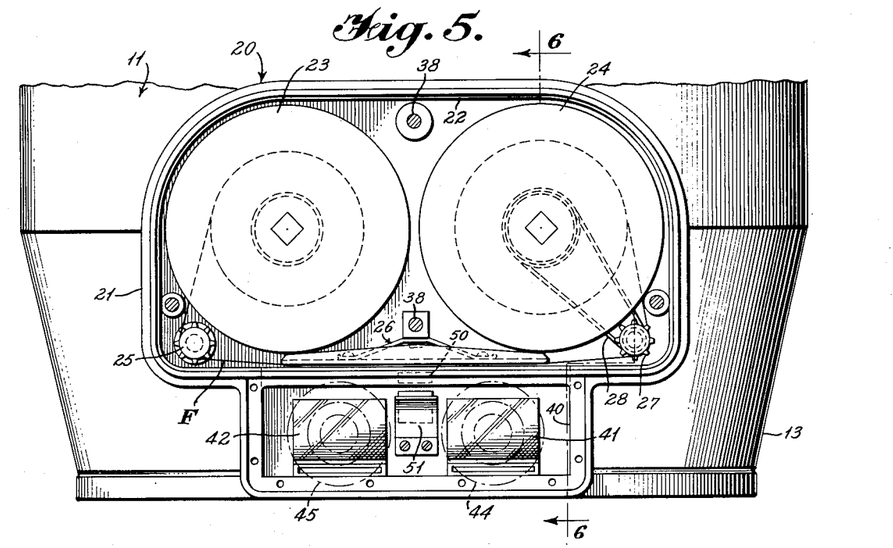
FIGURE 5 is a view taken on line 5—5 of FIGURE 4 showing the cover for the auxiliary camera removed.
Figure 6:
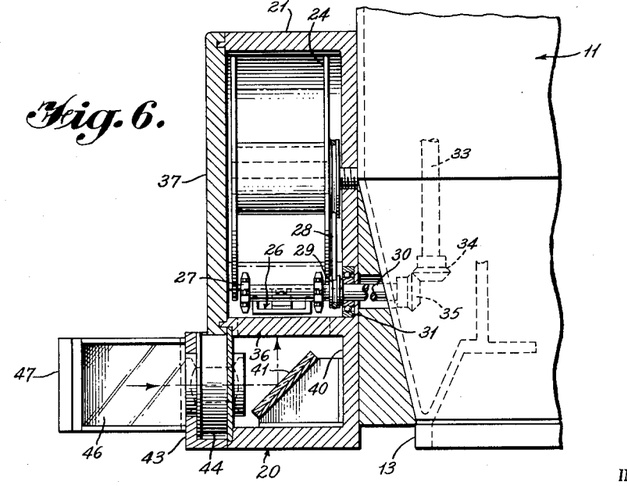
FIGURE 6 is a sectional view taken on line 6—6 of FIGURE 5.

Auxiliary camera 20 is mounted on the exterior surface of cone 13 and includes a casing 21 having a film magazine 22 which houses a film supply spool 23 and a film take up spool 24. Spool 23 carries the supply of film F for use in the auxiliary camera with the film extending from such spool around an idler sprocket 25 beneath a presser plate assembly 26 around a feed sprocket 27 and thereafter wound onto spool 24. Spool 24 is driven by a belt 28 which engages with a pulley on the spool and a pulley 29 carried on the shaft 30 which drives feed sprocket 27. Shaft 30 is journalled in bearings 31 and 32 and extends inwardly of the cone 13 to be driven through a shaft 33 by intermeshing bevel gears 34 and 35. Shaft 33 extends upwardly from the cone 13 of the aerial camera 11 and is driven by the drive means of the aerial camera. Shaft 33 is driven by the drive means of the aerial camera 11 such that the feed sprocket 27 will feed auxiliary film F beneath presser plate assembly 26 at a rate to position an unexposed portion of film F for recording the desired data corresponding to each aerial photograph taken by camera 11. It will be recognized that any suitable drive means for feeding the auxiliary film F may be employed within the scope of the instant invention as long as a new film section is positioned for the tilt record prior to taking each aerial photograph by camera 11.

The presser plate assembly 26 holds the film F, intermediate spools 23 and 24, positioned over apertures formed in the lower wall 36 of magazine 22. The apertures formed in the lower wall 36 of magazine 22 communicate with a chamber 40 disposed in the lower part of casing 21. The magazine 22 is provided with a cover 37 which is held in place by a series of bolts 38.

Chamber 40 has mounted therein reflecting mirrors positioned so as to reflect upwardly, onto the film F disposed across the apertures in the lower wall 36 of magazine 22, the horizon views and data projected onto such mirrors. A pair of mirrors 41 and 42 are mounted in chamber 40 with such mirrors being disposed at a 45° angle within the chamber so as to reflect views received through the front of the chamber upwardly through the apertures in the lower wall 36 of magazine 22. Mounted in the front wall 43 of chamber 40 and positioned directly in front of mirrors 41 and 42 are a pair of lens and shutter units 44 and 45. These lens and shutter units open outwardly of the chamber 40 and upon operation of the shutters of such units the views observed by the units are reflected upwardly by mirrors 41 and 42 and focused onto the film F positioned over the apertures in the wall 36 of magazine 22.

Lens and shutter unit 45 observes a view directly in front of such unit. A reflecting mirror 46 is mounted in a bracket 47 on the front wall 43 of chamber 40 with such mirror being disposed at a 45° angle in front of the lens and shutter unit 44. As shown by the arrows on FIGURES 2 and 4, the lens of unit 44 focuses a view received from a 90° angle to the axis of the unit while the lens of unit 45 focuses the view disposed directly in front of such unit. Accordingly, the two views focused onto film F represent views of the horizon taken in mutually perpendicular directions by reason of the provision of angled mirror 46 in front of the lens and shutter unit 44. It will be appreciated from the description given hereinafter that the horizon views need not necessarily be taken at 90° relative to one another but may be taken at other predetermined angles with respect to each other.

The units 44 and 45 may be of any suitable construction and the details thereof are not specifically shown on the drawings. In operation of the auxiliary camera to record on film F a pair of horizon views, taken in mutually perpendicular directions, simultaneously with the taking of the aerial survey photograph, it will be appreciated that the shutters of units 44 and 45 will be operated at the same instant that the shutter mechanism 16 of the aerial camera 11 is actuated. Desirably, such simultaneous operation of the three separate shutter mechanisms is effected by employing solenoids which are energized simultaneously to effect operation of the shutters of units 44 and 45 along with shutter mechanism 16.

In addition to the mirrors 41 and 42, a mirror 50 is mounted within chamber 40 positioned at a 45° angle to reflect upwardly onto film F a numerical designation so that the auxiliary film record may be provided with a number corresponding to the number applied to the edge of the main aerial photograph. Also, a mirror 51 is mounted at a 45° angle within chamber 40 to reflect upwardly onto film F a representation of the altitude at which the surveying aircraft is at the time of taking the aerial photograph and horizon views. The mirrors 50 and 51 are positioned between mirrors 41 and 42 so that the data reflected onto film F by mirrors 50 and 51 will be disposed intermediate the two horizon views taken simultaneously with each aerial photograph. Accordingly, for each photograph taken by the aerial camera a record on the auxiliary film F will be produced such as shown on FIGURE 3.

Figure 8:
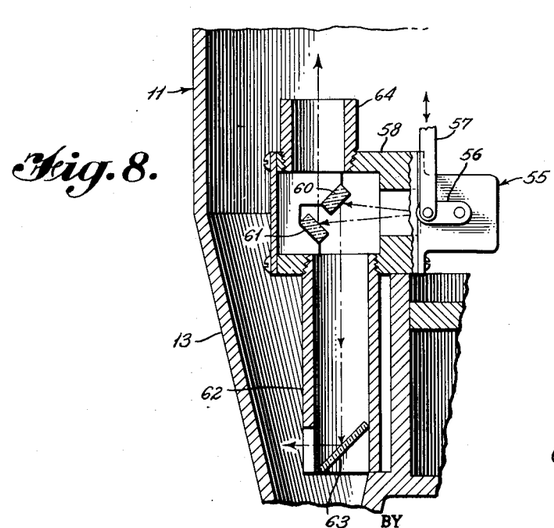
FIGURE 8 is a detailed sectional view taken on line 8—8 of FIGURE 4.

Reference will now be had to the structure employed to project the numerical designation onto both the auxiliary film F and the edge of the main aerial camera film. As shown on FIGURES 4 and 8 a more or less conventional counter device 55 is mounted within the aerial camera cone 13. Such device has an actuating arm 56 which is connected at its outer end to a link 57. Link 57 extends upwardly from the counter device 55 and is connected to an operator (not shown) in the aerial camera 11 so that upon the taking of each aerial photograph the link 57 will be operated to increase the number appearing on the device 55 by one digit. In the type of counter device as illustrated on the drawings, reciprocation of link 57 will through actuating arm 56 cause the numbering device to increase one digit for each reciprocation of link 57. The construction of such counter devices are old and well known and accordingly the details are not specifically illustrated on the drawings.

The number appearing on the device 55 is exposed to the interior of a housing 58. An illuminating means in the form of a bulb 59 (see FIGURE 4) is mounted within housing 58 along with a pair of reflecting mirrors 60 and 61. Mirror 60 serves to reflect the number of counter device 55 downwardly through duct 62 to be reflected horizontally by a mirror 63. Mirror 61 serves to reflect the number appearing on device 55 upwardly through duct 64 which directs the number designation upwardly onto the edge of the main aerial photograph film.

The mirror 63 reflects the numerical designation horizontally and laterally within the camera cone 13 to a mirror 65 mounted at a 45° angle in front of a bore 66 which communicates with chamber 40 and is axially aligned with mirror 50 mounted within the chamber. A suitable elongated lens 67 is provided in bore 66 to focus the number reading reflected from counter device 55 onto the auxiliary film F.

Figure 7:
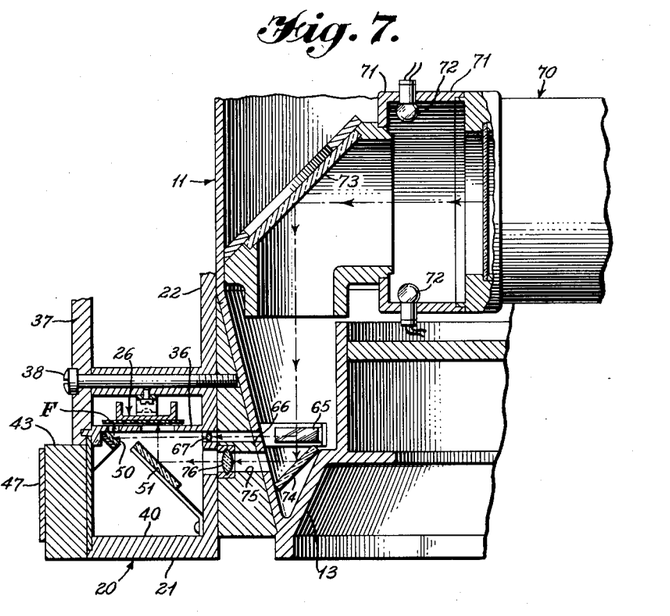
FIGURE 7 is a sectional view taken on line 7—7 of FIGURE 4.

As shown more clearly in FIGURES 4 and 7 an altimeter 70 is mounted within the cone 13 of the aerial camera. The dial face of this altimeter opens into a housing 71 which is provided with illuminating means in the form of bulbs 72. A condensing mirror 73 is mounted at an angle opposite the dial face of the altimeter 70 to reflect an image of the altimeter reading downwardly onto a mirror 74 mounted within cone 13 directly below mirror 73. Mirror 74 reflects the image horizontally outwardly through a bore 75 which communicates with chamber 40 and is axially aligned with mirror 51. A suitable focusing lens 76 is mounted in bore 75 to focus the image of the altimeter dial face on the surface of auxiliary film F.

Figure 3:
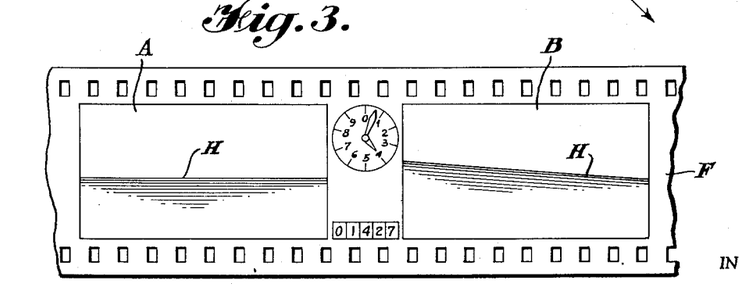
FIGURE 3 illustrates the record made on the auxiliary camera film corresponding to each aerial photograph.

It will be appreciated from the description of the structure illustrated on the drawing as given hereinafter that the auxiliary film F has assembled thereon the data as illustrated by the film segment of FIGURE 3 with such a film segment record being made for each individual photograph taken by the aerial camera 11. This data consists of two views of the horizon taken in mutually perpendicular directions together with a representation of the altitude at which the particular aerial photograph was taken and a numerical designation which corresponds to the numerical designation produced on the edge of the main aerial film. The altimeter reading and the numerical designation are positioned between each pair of horizon views on the film segment.

In operation of the aerial camera 11 and auxiliary camera 20 a segment of unexposed film F is positioned beneath the presser plate mechanism 26 across the apertures in the lower wall 36 of magazine 22. At the same time a length of film is positioned for exposure within the aerial camera 11. The aerial camera 11 carrying the auxiliary camera 20 on its support 12 is aligned as near as possible to the vertical prior to the taking of the aerial picture. As mentioned hereinabove, the actuation of shutter 16 on the aerial camera and the shutters of units 44 and 45 of the auxiliary camera are synchronized so that upon exposure of the aerial camera film the horizon views at mutually perpendicular directions will be exposed on the auxiliary film F. The bulb 59 for the counter device 55 and bulbs 72 for the altimeter 70 are also connected to be energized in unison with actuation of the shutters on the auxiliary camera and main aerial camera. Such bulbs are illuminated momentarily as the various shutters operate so that an image of the counter device 55 at the particular instant of exposure of the auxiliary film F and aerial camera film will be focused onto the edge of the main film and onto the auxiliary film F between the horizon views. At the same time the image of the altimeter dial will be reflected and focused onto the auxiliary film F also between the horizon views.

After the taking of each aerial photograph together with the production of the record data produced in auxiliary camera 20, the drive for the aerial camera 11 operates to position an unexposed portion of the aerial film for taking of the next aerial photograph. The drive also actuates, through shaft 33, feed sprocket 27 so as to move an unexposed film portion through the auxiliary camera for positioning in readiness for the next aerial photograph to be taken. At this time link 57 is operated by the aerial camera drive to increase by one digit the numerical designation appearing on counter device 55. Of course, the altimeter 70 is continuously operable to provide a reading as to the altitude of the surveying aircraft which such reading being focused onto film F along with the reading of counter device 55 only during the momentary illumination of bulbs 72 and bulb 59.

Reference will now be had to the method by which the data assembled on the auxiliary film F is employed to determine the tilt, if any, existent in the aerial camera at the time of taking the aerial photograph. As will be apparent from the description above, each photograph made by the aerial camera 11 will have a corresponding portion on the auxiliary film F which is used to interpret and correct any distortions in the main photograph which may have been created by reason of the aerial camera being tilted from the vertical at the time of taking the aerial photograph. The numerical designation provided on the edge of the aerial camera film and on the auxiliary film is used to correlate the proper portion of the auxiliary film with the particular aerial photograph to which it coresponds.

Figure 9:
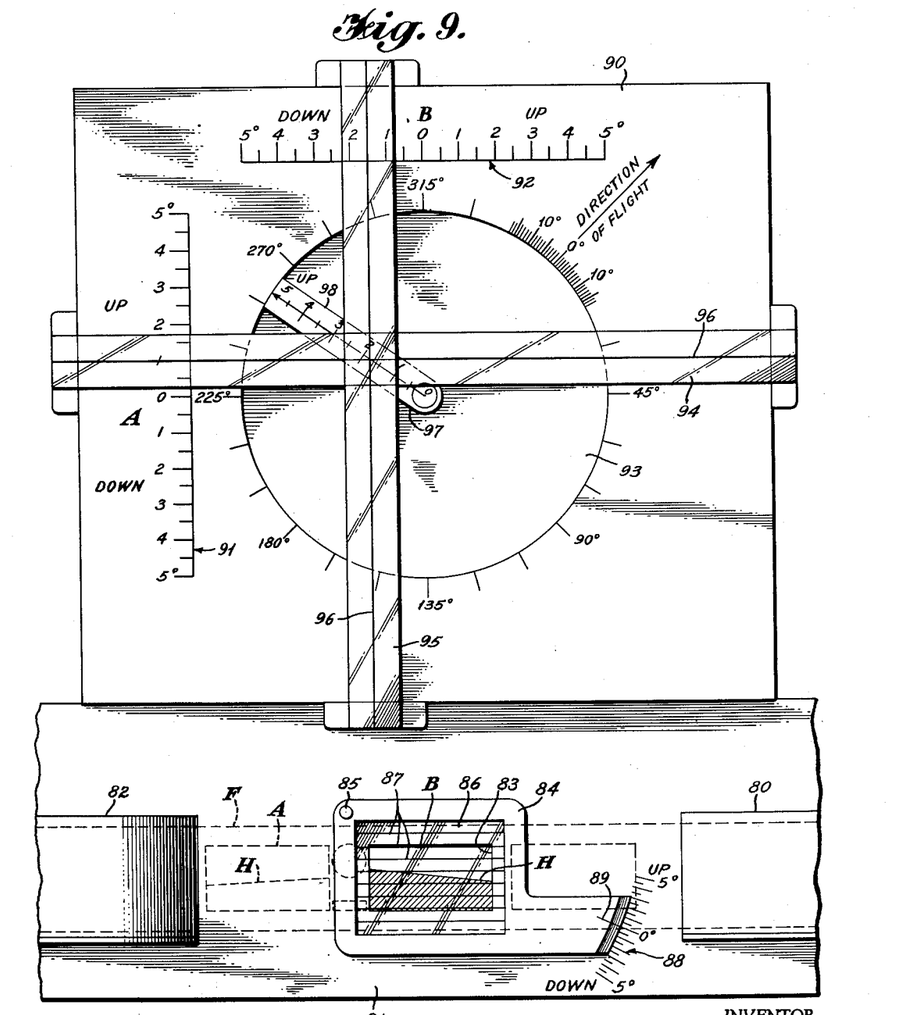
FIGURE 9 is an elevational view of the computer employed in correlating the data assembled on the auxiliary camera film to determine the angle, relative to the vertical, and the azimuth, relative to the direction of flight, of the tilt of the aerial camera for each aerial photograph.

The tilt computer structure is shown on FIGURE 9. The spool 24 which has the exposed auxiliary film wound thereon is mounted in casing 80 to be unreeled to extend beneath and across a table 81 and wound onto an empty reel rotatably mounted in a casing 82 to the left of and spaced from casing 80 as shown on FIGURE 9. Table 81 is provided with a rectangular window 83 corresponding in size to the dimensions of the individual horizon views appearing on auxiliary film F so that each such horizon view may be individually interpreted to determine the angle of the horizon appearing thereon relative to the horizontal. Desirably, a light source is provided below the table 81 and auxiliary film F to illuminate the picture so that an accurate reading of the horizon on the view may be made through window 83.

A scale element 84 is pivotally mounted at 85 on table 81 to overlie the rectangular window 83 provided in the table surface. The scale element 84 carries a transparent section 86 which has marked thereon a series of parallel lines 87. These lines on transparent section 86 are provided to facilitate adjustment of scale element 84 so that the lines will be disposed parallel with the horizon appearing on the particular horizon view being interpreted. A graduated scale 88 is provided on table 81 having degree designations from 5° "down" through 0° to 5° "up." Scale element 84 carries a marker 89 which is movable along the graduated scale 88 as element 84 is pivoted about 85 to align lines 87 with the horizon on the view being interpreted.

In utilizing the portion of the computer described hereinabove, each of the horizon views is considered individually to determine whether the horizon in the particular view is horizontal or extends upwardly or downwardly at some particular angle relative to the horizontal. For example, in the view appearing through the window 83 on FIGURE 9, the horizon H slopes downwardly toward its right side. It will be noted that the lines 87 on transparent section 86 are horizontal as shown and marker 89 is aligned with the 0° mark on graduated scale 88. To determine the angle of slope of horizon H, scale element 84 will be pivoted about 85 until lines 87 are generally parallel with horizon H. The marker 89 will have been moved along the "down" portion of graduated scale 88. When lines 87 are parallel with horizon H, the angle of slope of such horizon may be read by reference to the location of marker 89 relative to scale 88.

Consideration will now be given to the other parts of the tilt computer as shown on the upper portion of FIGURE 9. There are provided on a board 90 two linear scales 91 and 92 bearing the designations A and B with such scales being disposed at right angles to one another. The angular relation between these scales is determined by the angular displacement between the horizon views. Accordingly, if the auxiliary camera is constructed to take the horizon views in directions spaced 60° from each other, the scales 91 and 92 will be disposed at 60° with respect to one another. These scales bear degree graduations comparable to the graduated scale 88 referred to above. Thus each scale is graduated from 5° "down" through 0° to 5° "up."

A circle 93 representing a 360° arc is related to scales 91 and 92 so that the center of the circle is vertically aligned with the 0° point on scale 92 and horizontally aligned with the 0° point on scale 91. Further, the degree graduations on circle 93 are related to scales 91 and 92 so that the 0° or 360° point on circle 93 represents the direction of flight of the surveying aircraft. The scales 91 and 92 are disposed with respect to the scale on circle 93 so as to be parallel with the tangent to the circle at the azimuth relative to the direction of flight in which the respective horizon views are taken. Accordingly, scale A is parallel with the tangent at the 225° azimuth and scale B is parallel with the tangent of circle 93 at the 135° azimuth where 0° on the circle corresponds with the direction of flight.

The designations A and B are employed to identify the two horizon views taken by the auxiliary camera 20. For purposes of description of the specific structure on the drawings the A horizon view corresponds with the view received through unit 45 of auxiliary camera 20. This view is of the horizon at an angle of 45° to the direction of flight or in the azimuth of 225° where 0° corresponds to the direction of flight. Similarly, the B horizon view corresponds with the view taken through unit 44 of auxiliary camera 20 and is of the horizon in the direction of 135° where 0° corresponds to the direction of flight. Thus, scale 91 designated A is employed in the application of angles of slope of the A horizon view and scale 92 designated B is utilized in connection with the angles of slope of the B horizon view. To apply the angle of slope information from the horizon views there are provided a pair of transparent slide markers 94 and 95 mounted on board 90 with marker 94 being movable up and down across the board while remaining horizontal and marker 95 being movable laterally across the board while retaining its vertical relation to the board at any point. Each marker carries an indicator line 96.

Underlying the markers 94 and 95 and pivoted at the center of circle 93 is a pointer 97. This pointer has an indicator line 98 extending from the center of circle 93 radially outwardly to the periphery of the circle and graduated similar to the degree graduations provided on scales 91 and 92. As will be apparent from the description below, the graduations on pointer 97 and the intersection of indicator line 98 with the degree markings on circle 93 provided the resultant determination of the magnitude and azimuth of tilt, respectively, of the aerial camera with reference to the line of flight at the time the aerial photograph was taken.

The method of interpreting the information provided by the horizon views on the auxiliary film F will now be set forth. It should be kept in mind that the interpretation of the two related horizon views gives as the final result an indication of both the magnitude and azimuth of tilt, if any, which existed at the time of taking a particular aerial photograph.

On FIGURE 9 the auxiliary film F is shown positioned in the computer with the right horizon view aligned with the rectangular window 83 for determining the angle of the horizon shown on such view relative to the horizontal. To facilitate description of the steps taken in interpreting the data on the auxiliary film, the horizon view to the left of the altimeter and numerical designations has been identified "A" and the horizon view to the right of such designations identified "B." The horizon view B is positioned beneath window 83 as shown on FIGURE 9. As referred to hereinabove, view A is taken through unit 45 of auxiliary camera 20 and view B is taken through unit 44 of the auxiliary camera.

As described above, the scale element 84 is pivoted about 85 until lines 87 are brought into substantial parallelism with the horizon H on horizon view B. Marker 89 will then be positioned at a degree indication on graduated scale 88 denoting that horizon H on view B slopes downwardly toward the right side thereof at an angle of, for example, 1.5°. The slide marker 95 will be moved laterally along board 90 so that its indicator line 96 is aligned with the 1.5° "down" graduation on scale 92, which scale bears the designation B. A similar determination of the slope of horizon H on view A will have been made by aligning such view with rectangular window 83 and moving scale element 84 until the lines 87 carried thereby are generally parallel with the slope of view A. The marker 89 will then be aligned with one of the graduations on scale 88 indicating the angle of slope of the horizon for this particular view. Assuming that the horizon H in view A slopes upwardly at an angle of 1° then the slide marker 94 will be moved upwardly on board 90 until its indicator line 96 is aligned with the 1° "up" graduation on scale 91, identified as scale A.

The intersection of indicator lines 96 on slides 94 and 95 provides a reference point from which the resultant tilt is determined. Pointer 97 is pivoted about the center of circle 93 until its graduated line 98 extends from the center of the circle through the intersection point of indicator lines 96. The direction of graduated scale 98 and the location of the intersection point of lines 96 on such scale provide an indication of the azimuth and magnitude, respectively, of the tilt which existed at the time the aerial photograph, to which the interpreted horizon views A and B correspond, was taken. Thus, in the example as described and shown on FIGURE 9, the magnitude of the tilt is indicated as being 1.8° and the direction or azimuth of tilt, in relation to the direction of flight of the surveying aircraft, 259°. In other words, the aerial photograph which corresponds to the data on the auxiliary film interpreted by the computer structure, may be corrected for the tilt existent at the time such photograph was taken by employing the 1.8° tilt and 259° bearing in the photograph rectifier apparatus.

It will be appreciated that the slopes of the horizons shown on views A and B of film F in FIGURE 9 are exaggerated on the drawings to more clearly emphasize the novel features of the instant invention. Likewise, the scales shown including only up to 5° are merely set forth by way of example. Obviously, scales designating larger tilts may be employed in the computer construction within the scope of the instant invention. However, it is to be noted that at the time of taking the aerial photograph, the camera is vertically aligned as near as reasonably possible. Accordingly, the tilt, if any, existent at the time of taking the aerial photograph will be relatively small. The auxiliary camera 20 is supplied to accurately record the existence of any such tilt in a manner such as may be interpreted by the hereinabove described method to determine the magnitude and direction of tilt for use in correcting the aerial photograph.

On the illustrated embodiment the auxiliary camera has been shown as a separate device attached to and connected to be operated with the aerial camera. It will be readily appreciated that if desired such an auxiliary camera mechanism may be built into the aerial camera as an integral part thereof at the time of constructing such aerial camera. The significant feature of the invention is that the auxiliary camera mechanism moves along with the aerial camera so that the horizon views offer a record of the aerial camera tilt.

With regard to the horizon views, it has been illustrated that such views be taken at 90° to one another. Such a structure is indeed preferred, due to certain simplifications in computing the tilt of the aerial camera. However, within limits the horizons may be taken at a greater or lesser angle than 90°. Where the horizon views are taken at some angle other than 90° to one another, the scales 91 and 92 will be disposed on the computer at an angle relative to each other corresponding to the angle at which the horizon views were taken.

A particularly important feature in the provision of a separate camera mechanism for recording on an auxiliary film the horizon views along with other pertinent data is the fact that the lenses in units 44 and 45 may have a relatively short focal length since the horizon view is focused on film F with the film spaced only a short distance from the lens and shutter units. Thus, it is not necessary that the horizon views be focused from a point adjacent the underside of the fuselage of the aircraft up onto the aerial film carried by the surveying camera. The advantage of employing short focal length lenses is particularly important where infrared film is used for the auxiliary film record. Such infrared film is an advantage in recording the horizon views since it enables the production of a photographic record of the horizon giving a clear indication of the existence of any slope in the horizon as detected by the auxiliary camera at the time of taking the aerial photograph. Accordingly, the interpretation of the horizon slope by employing the computer of FIGURE 9 is materially facilitated.

This application is a division of my co-pending application, Serial No. 502,617 filed April 20, 1955.

Having thus described my invention, what I claim is:

1. An apparatus for aerial surveying comprising an aerial camera having a shutter and a lens for focusing the terrain to be surveyed onto the aerial camera film, said aerial camera having a housing enclosing said shutter and aerial lens including a downwardly extending camera cone portion to project through a fuselage opening of a surveying aircraft in use of the apparatus, an auxiliary camera carried by said aerial camera on the lower end of said downwardly extending camera cone portion of said housing, said auxiliary camera including; means for holding a supply of auxiliary film for recording thereon data pertinent to the attitude of the aerial camera relative to the earth, first means in said auxiliary camera in close proximity to said auxiliary film holding means for focusing a horizon view on the auxiliary film through a first line of sight, second means in said auxiliary camera in close proximity to said auxiliary film holding means for focusing a horizon view on the auxiliary film through a second line of sight, said first and second lines of sight through which said horizon views are received lying in a common plane and disposed at a predetermined angle relative to one another and to the aerial camera with said common plane being generally normal to the focal axis of the aerial camera lens and below the said aircraft fuselage opening, a shutter associated with each of said first and second means, and means for simultaneously actuating the shutters of said aerial and auxiliary cameras whereby a pair of horizon views will be recorded on the auxiliary film along with the taking of the aerial photograph by said aerial camera.

2. An apparatus for aerial surveying comprising an aerial camera having a shutter and a lens for focusing the terrain to be surveyed onto the aerial camera film, said aerial camera having a housing enclosing said shutter and aerial lens including a downwardly extending camera cone portion to project through a fuselage opening of a surveying aircraft in use of the apparatus, an auxiliary camera carried by said aerial camera on the lower end of said downwardly extending camera cone portion of said housing, said auxiliary camera including; means for holding a supply of auxiliary film for recording thereon data pertinent to the attitude of the aerial camera relative to the earth, a first lens and shutter unit in said auxiliary camera in close proximity to said film holding means to focus on the auxiliary film a view of the horizon through a line of sight generally normal to the focal axis of the aerial camera lens and below the aircraft fuselage opening and at a predetermined angle relative to the aerial camera, a second lens and shutter unit in said auxiliary camera in close proximity to said film holding means having a reflector associated therewith to focus on the auxiliary film a view of the horizon through a line of sight generally normal to the focal axis of the aerial camera lens and below the aircraft fuselage opening and at a predetermined angle relative to the aerial camera and to the line of sight through which the first-mentioned horizon view is received, and means for simultaneously actuating the shutters of said aerial and auxiliary cameras whereby a pair of horizon views will be recorded on the auxiliary film along with the taking of the aerial photograph by said aerial camera.

3. An apparatus for aerial surveying comprising an aerial camera having a shutter and a lens for focusing the terrain to be surveyed onto the aerial camera film, said aerial camera having a housing enclosing said shutter and aerial lens and including a downwardly extending portion, an auxiliary camera carried by said aerial camera on said downwardly extending portion of said housing, said auxiliary camera including; means for holding a supply of auxiliary film for recording data pertinent to the attitude of the aerial camera relative to the earth, first means carried by said auxiliary camera for focusing a horizon view on the auxiliary film through a first line of sight, second means carried by said auxiliary camera for focusing a horizon view on the auxiliary film through a second line of sight, said first and second lines of sight through which said horizon views are received lying in a common plane and disposed at a preterminded angle relative to one another and to the aerial camera with said common plane being generally normal to the focal axis of the aerial camera lens, a shutter associated with each of said first and second means, means for actuating simultaneously the shutters of said aerial and auxiliary cameras whereby a pair of horizon views will be recorded on the auxiliary film along with the taking of the aerial photograph by said aerial camera, an altimeter carried by said aerial camera, a counter device carried by said aerial camera, means for focusing the indications of said altimeter and said counter device on the auxiliary film, means for projecting the indication of said counter device onto the aerial camera film, and means for illuminating the altimeter and counter device momentarily upon actuation of said shutters whereby a record of the altitude and a numeral will be produced on the auxiliary film and an identical number will be recorded on the aerial film at the time of taking the aerial photograph.

4. An apparatus for aerial surveying comprising an aerial camera having a shutter and an aerial lens with the focal axis directed generally vertically, said aerial camera having a housing enclosing said shutter and aerial lens and including a downwardly extending camera cone portion, means within said housing for positioning a photographic film in the focal plane of said aerial lens, means on the lower end of said camera cone portion for holding a supply of auxiliary film for recording thereon data pertinent to the attitude of the aerial camera relative to the earth, first means mounted on the lower end of the downwardly extending camera cone portion of said housing in close proximity to said film holding means and to be disposed below the aircraft fuselage for focusing a horizon view on the auxiliary film through a first line of sight, second means mounted on the lower end of the downwardly extending portion of said housing in close proximity to said film holding means to to be disposed below the aircraft fuselage for focusing a horizon view on the auxiliary film through a second line of sight, said first and second lines of sight through which said horizon views are received lying in a common plane and disposed at a predetermined angle relative to one another and to the aerial camera with said common plane being generally normal to the focal axis of the aerial camera lens, and below the fuselage, a shutter associated with each of said first and second means, and means for simultaneously actuating all of said shutters whereby a pair of horizon views will be recorded on the auxiliary film along with the taking of the aerial photograph by said aerial camera.

5. An apparatus for aerial surveying comprising an aerial camera having a shutter and an aerial lens with the focal axis directed generailly vertically, said aerial camera having housing enclosing said shutter and aerial lens and including a downwardly extending portion, means within said housing for positioning a photographic film in the focal plane of said aerial lens, means for holding a supply of auxiliary film for recording thereon data pertinent to the attitude of the aerial camera relative to the earth, first means mounted adjacent the lower end of the downwardly extending portion of said housing for focusing a horizon view on the auxiliary film through a first line of sight, second means mounted adjacent the lower end of the downwardly extending portion of said housing for focusing a horizon view on the auxiliary film through a second line of sight, said first and second lines of sight through which said horizon views are received lying in a common plane and disposed at a predetermined angle relative to one another and to the aerial camera with said common plane being generally normal to the focal axis of the aerial camera lens, a counter device carried by said housing, means for conveying the numerical indication of said counter device to the auxiliary film and to the aerial camera photographic film whereby the numeral on the counter device will be produced on the auxiliary film and an identical numeral will be recorded on the aerial film at the time of taking the aerial photograph, a shutter associated with each of said first and second means, and means for simultaneously actuating all of said shutters whereby a pair of horizon views will be recorded on the auxiliary film along with the taking of the aerial photograph by said aerial camera.

6. An apparatus for aerial surveying comprising a surveying aircraft having a fuselage opening, a support mounted adjacent said opening, an aerial camera mounted on said support having a shutter and an aerial lens with the focal axis directed generally vertically of said support and through said opening, said aerial camera having a housing enclosing said shutter and aerial lens and including a camera cone portion extending downwardly and through said fuselage opening, an air deflector formed on the underside of said fuselage upstream from said fuselage opening and protruding downwardly to deflect the airstream from the part of said camera cone portion disposed beneath said fuselage, means within said housing for positioning a photographic film in the focal plane of said aerial lens, means on the lower end of said camera cone portion for holding a supply of auxiliary film for recording thereon data pertinent to the attitude of the aerial camera relative to the earth, first means mounted on the lower end of the downwardly extending camera cone portion of said housing in close proximity to said auxiliary film holding means and disposed below the aircraft fuselage for focusing a horizon view on the auxiliary film through a first line of sight, second means mounted on the lower end of the downwardly extending portion of said housing in close proximity to said auxiliary film holding means and disposed below the aircraft fuselage for focusing a horizon view on the auxiliary film through a second line of sight, said first and second lines of sight through which said horizon views are received lying in a common plane and disposed at a predetermined angle relative to one another and to the aerial camera with said common plane being generally normal to the focal axis of the aerial camera lens and below the aircraft fuselage, a shutter associated with each of said first and second means, and means for simultaneously actuating all of said shutters whereby a pair of horizon views will be recorded on the auxiliary film along with the taking of the aerial photograph by said aerial camera.

References Cited in the file of this patent

UNITED STATES PATENTS

| 1,626,787 | Corlett | May 3, 1927 |
| 1,764,066 | Chamberlin | June 17, 1930 |
| 2,004,951 | Jensen | June 18, 1935 |
| 2,273,876 | Lutz et al. | Feb. 24, 1942 |
| 2,471,450 | Reza | May 31, 1949 |
| 2,756,653 | Nistri | July 31, 1956 |

FOREIGN PATENTS

| 165,181 | Great Britain | June 20, 1921 |